United States Patent

Kujawa, Jr. et al.

Patent Number: 5,166,611
Date of Patent: Nov. 24, 1992

[54] TONE WHEEL WITH COINED SERRATIONS FOR ENGAGING AN ANNULAR SUPPORT SURFACE AND METHOD OF ASSEMBLING SAME ON A WHEEL BEARING SEAL

[75] Inventors: Anthony Kujawa, Jr., Temperance, Mich.; Frank J. Kujawa, Toledo, Ohio

[73] Assignee: Production Research, Inc., Toledo, Ohio

[21] Appl. No.: 818,278

[22] Filed: Jan. 8, 1992

[51] Int. Cl.⁵ .................. G01P 3/48; F16C 32/00; B21D 39/00
[52] U.S. Cl. ..................... 324/166; 29/520; 29/522.1; 73/494; 324/173; 324/175; 324/207.22; 384/448
[58] Field of Search ............... 324/160, 166, 173, 174, 324/175, 207.22, 207.25; 310/168; 29/505, 515, 520, 522.1; 73/494, 518, 519; 384/448

[56] References Cited

U.S. PATENT DOCUMENTS

| | | | |
|---|---|---|---|
| 3,482,129 | 12/1969 | Riordan | 310/75 R X |
| 3,626,226 | 12/1971 | Pauwels et al. | 310/168 |
| 3,772,547 | 11/1973 | Abate | 310/168 |
| 4,795,278 | 1/1989 | Hayashi | 310/168 X |
| 4,940,937 | 7/1990 | Hattori et al. | 324/207.22 |
| 5,002,287 | 3/1991 | Eskilsson | 384/448 X |
| 5,002,404 | 3/1991 | Zernickel et al. | 384/444 |
| 5,081,416 | 1/1992 | La Croix | 324/207.22 X |

Primary Examiner—Gerard R. Strecker
Attorney, Agent, or Firm—William J. Clemens

[57] ABSTRACT

A speed sensor tone wheel has a plurality of serrations formed on an inner periphery for engagement with an axially extending annular surface formed on a wheel bearing seal support. The tone wheel is mounted on the support and an outwardly facing surface of the serrations is coined to force the inner ends of the serrations into contact with the annular surface to prevent relative rotation between the tone wheel and the support. Tabs can be formed in the outer periphery of a radially outwardly extending flange of the wheel bearing seal support for extending through open spaces between the serrations and engaging a surface of the tone wheel to trap the tone wheel between the support flange and the tab. Alternatively, an indentation can be formed in the flange to project into an associated one of the serrations.

14 Claims, 2 Drawing Sheets

TONE WHEEL WITH COINED SERRATIONS FOR ENGAGING AN ANNULAR SUPPORT SURFACE AND METHOD OF ASSEMBLING SAME ON A WHEEL BEARING SEAL

BACKGROUND OF THE INVENTION

The present invention relates generally to vehicle speed sensors and, in particular, to a tone wheel apparatus and a method of assembling the tone wheel on a vehicle wheel bearing seal.

The U.S. Pat. No. 3,482,129 discloses an inductor generator with a self-lubricating bearing. A tone wheel is mounted on a Teflon bearing ring and has fingers which engage fingers formed on a drive ring on the generator axle shaft.

The U.S. Pat. No. 3,626,226 discloses a cup shaped tone wheel pressed onto a pilot on a wheel hub and having a flange for increasing the surface contact area.

The U.S. Pat. No. 3,772,547 discloses a tone wheel mounted on an end of a tubular sleeve encircling a vehicle axle shaft. The end of the sleeve is swaged over and has a bearing located against the tone wheel by a swaged collar.

The U.S. Pat. No. 4,795,278 discloses a tone wheel in the form of a pulsar gear pressed onto an outer ring of a bearing.

Other types of prior art speed sensors are shown in the FIGS. 1 and 2. In the FIG. 1, as discussed below, there is shown a tone wheel and a wheel bearing support formed as an integral part. One undesirable feature of this apparatus is that the position, size and/or number of sensor apertures cannot be changed easily.

In the FIG. 2, a tone wheel is mounted on a wheel bearing seal by pressing onto an axially extending surface of the wheel bearing seal against a radially extending flange joined to the axially extending surface by a radiused portion. Due to the thicknesses of the parts and the size of the radius, very little contact is made between the parts which can lead to undersirable errors in the speed sensed. For example, misalignment of the tone wheel with respect to a desired plane of rotation can occur which could cause the sensor to miss counts in a sector of the tone wheel spaced too far away from the sensor. Also, relative rotation between the seal and the tone wheel could occur resulting in high or low readings with respect to the actual speed. Furthermore, the tone wheel can scrape and damage the protective coating on the seal during assembly.

SUMMARY OF THE INVENTION

The present invention concerns a tone wheel for operation in a vehicle wheel speed sensor system and a method of assembling the tone wheel to a wheel bearing seal support. The invention includes a first embodiment in which serrations are formed along the edge of a central aperture in a speed sensor tone wheel. The tone wheel is pressed onto an axially extending surface of a wheel bearing seal support against a radially extending flange connected to the axially extending surface by a radiused portion. The fit between the tone wheel and the seal support is loose enought so as not to scrape the coating on the seal support axially extending surface as the parts are assembled. The tone wheel is coined about the central aperture to force the serrated edge to engage the radiused portion of the seal support and prevent relative rotation between the tone wheel and the seal support.

In a second embodiment, the parts are assembled as described with respect to the first embodiment. However, tabs are formed in the seal support flange and extend through the serrations in the tone wheel. When the parts are assembled, the tabs are bent into engagement with the tone wheel to prevent relative rotation and disassembly. In the alternative, no tabs are formed and instead indentations are made in the back surface of the flange to form projections on the facing surface of the flange to engage the serrations and a staking operation can be used in place of the coining operation.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
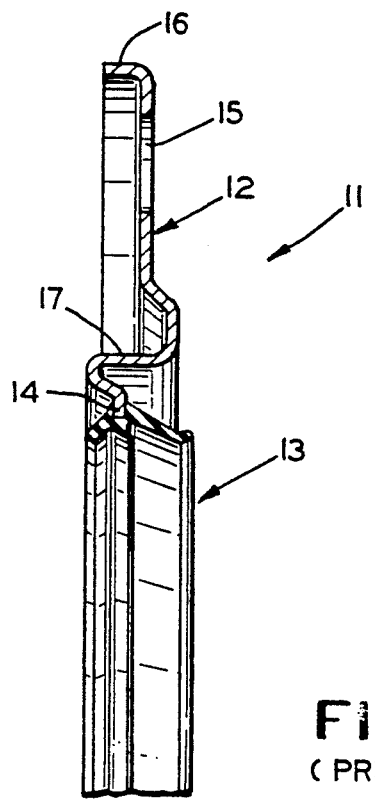
FIG. 1 is a cross-sectional side elevation view of a prior art wheel bearing seal with an integral tone wheel.

There is shown in the FIG. 1 a prior art wheel bearing assembly 11 having an integral tone wheel for use with a speed sensor (not shown). The assembly 11 has a support ring 12 which is typically formed as a steel stamping. A seal 13 is attached to an inner periphery 14 of the ring 12 by any suitable means. The seal 13 is typically formed by molding an elastomeric material in place on the periphery 14. A predetermined plurality of apertures or windows 15 are formed in the ring 12 adjacent an outer periphery 16 thereof. The apertures 15 typically are located with regular spacing along a predetermined radius from a center of a central aperture formed in the ring 12.

In operation, the assembly 11 is mounted concentric with a vehicle axle axis of rotation such as by press fit contact of a generally horizontally extending surface 17 of the ring 12 with, for example, an interior surface of hub of a disk brake rotor (not shown). Thus, the assembly 11 is rotated with the associated disk brake rotor and wheel while the seal 13 extends into sealing and sliding engagement with a portion of the axle housing to seal a bearing mounted between the axle housing and the disk brake rotor. A sensor (not shown) is attached to a portion of the axle housing adjacent to the path of rotation of the apertures 15. The sensor is responsive to the difference between the apertures 15 and a portion of the ring 12 between the apertures 15 for generating a pulsed signal the frequency of which represents the speed of rotation of the vehicle wheel. For example, the sensor could be photosensitive and a light source could be mounted on the opposite side of the ring 12 such that the sensor responds to pulses of light. Alternatively, the sensor could be magnetic and responsive to the passing ring portions. In any case, the speed sensor generates a pulsed signal representing the speed of rotation of the associated vehicle wheel. Thus, it is very important that the assembly 11 not slip with respect to the associated disk brake rotor and not be misaligned with respect to a desired plane of rotation adjacent to the speed sensor.

Figure 2:
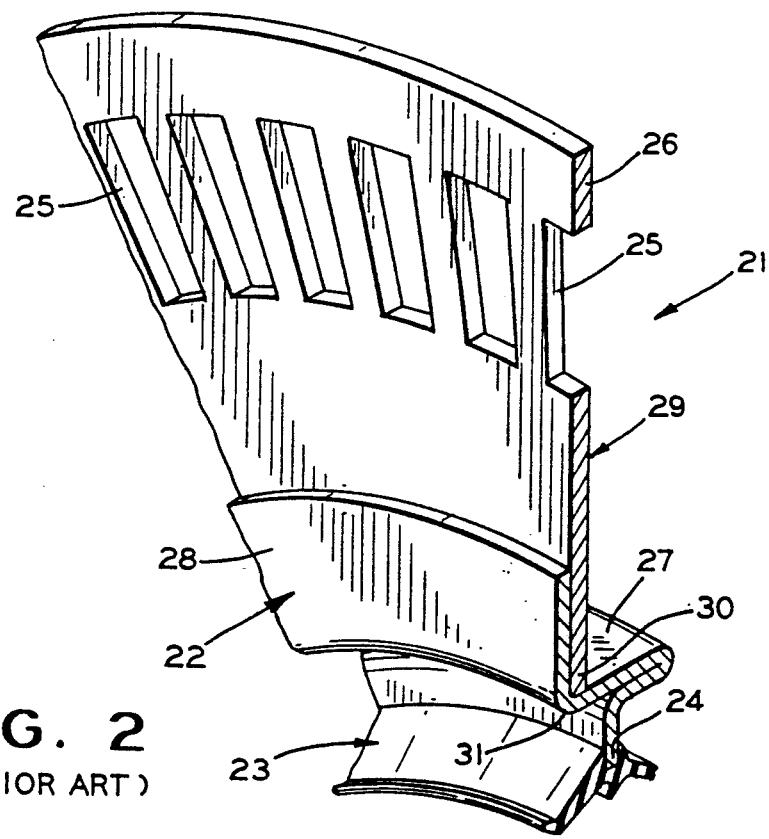
FIG. 2 is fragmentary perspective view of another prior art wheel bearing seal with a separate tone wheel attached.

Although the assembly 11 shown in the FIG. 1 avoids assembly misalignment and slippage problems due to the integral construction thereof, a whole new assembly must be provided if it is desired to change the configuration, number and/or location of the apertures 15. There is shown in the FIG. 2 an alternative construction for the prior art wheel bearing and tone wheel assembly 11. In the FIG. 2, an assembly 21 includes a ring-shaped support 22 and a seal 23 molded on to an inner periphery 24 of the support 22. A plurality of apertures 25 are formed at a predetermined radius adjacent an outer periphery 26 of the assembly 21. The support 22 has a generally axially extending outer surface 27 formed thereon for engaging a rotatable element such as a disk brake rotor. The support 22 extends radially outwardly from the inner periphery 24 and then turns to extend in an axial direction. The support 22 turns back on itself to extend in an opposite axial direction to form the outwardly facing surface 27. The support 22 extends in an axial direction past the plane of the inner periphery 24 and then curves to extend in a radially outwardly extending direction forming a flange 28.

The apertures 25 are formed in a generally planer tone wheel 29 having the outer periphery 26 and a central aperture defined by an inner periphery 30. In order to attach the tone wheel 29 to the support 22, the inner periphery 30 is formed with a dimension which will cause a press fit with the surface 27. Of course, as the tone wheel 29 is being pressed onto the support 22, the edge of the inner periphery 30 will tend to scrape and scratch any protective coating on the surface 27. Furthermore, the forming of the support 22 creates a curved or radiused portion 31 between the surface 27 and the corresponding surface of the flange 28. However, the inner periphery 30 of the tone wheel 29 is formed with relatively square sharp edges to provide a relatively flat surface for contact with the surface 27. If for example, the tone wheel 29 has a thickness of 0.054 inches and the support 22 has a thickness of 0.035 inches with a 0.035 inch radius portion 31, when the tone wheel 29 is pressed onto the surface 27, the leading edge of the inner periphery 30 will be deformed by the radius portion 31 to have a curved configuration. When the facing surfaces of the flange 28 and the tone wheel 29 are in an abutting relationship, only 0.019 inches of the surface of the inner periphery 31 will remain in contact with the surface 27. Thus, the tone wheel 29 will have a tendency to loosen and allow the tone wheel 29 to become misaligned to a desired plane rotation and/or slip in rotation with respect to the support 22. The tone wheel and method of assembly to a wheel bearing seal in accordance with the present invention solves these problems of the prior art wheel bearing seal and tone wheel assemblies.

Figure 3:
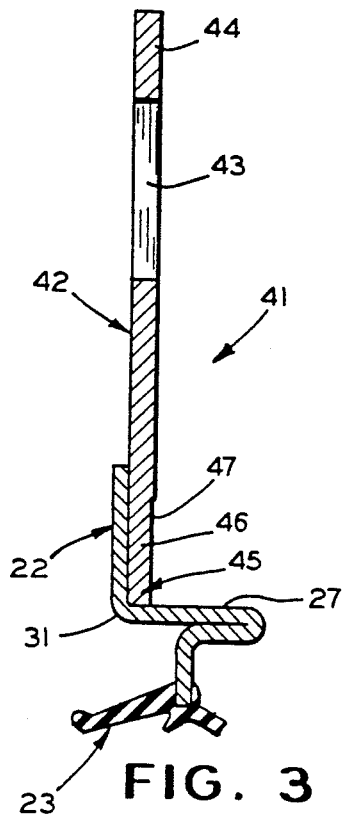
FIG. 3 is a cross-sectional side elevation view of the wheel bearing seal shown in the FIG. 1 with a tone wheel in accordance with the present invention attached.
Figure 4:
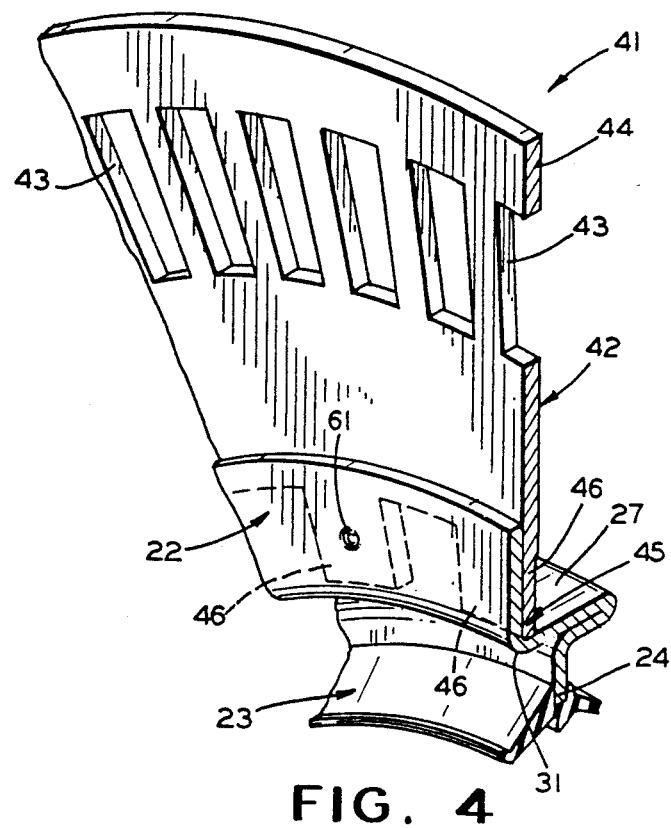
FIG. 4 is a perspective view of the assembly shown in the FIG. 1.

There is shown in the FIGS. 3 and 4 an apparatus 41 including a wheel bearing seal assembled to a speed sensor tone wheel. The wheel bearing seal can be the prior art support 22 and seal 23 shown in the FIG. 2. The tone wheel can be a tone wheel 42 having a plurality of apertures 43 formed therein at a predetermined radius adjacent an outer periphery thereof. The tone wheel 42 also has a central aperture formed therein defined by an inner periphery 45. The inner periphery 45 has a plurality of regularly spaced serrations 46 formed therein. In contrast to the use of a press fit in the prior art assembly 32 shown in the FIG. 2, the inner periphery 45 is of a dimension that provides a loose fit on the surface 27 thereby avoiding damage to the protective coating during assembly. An outwardly facing surface 47 of the serrations 46 is then subjected to a coining operation which reduces the thickness of the tone wheel 42 in that area and elongates the serrations 46 into contact with the surface 27. For example, if the tone wheel 42 has a thickness of 0.045 inches, the surface area 47 can be coined to reduce the thickness by approximately 0.006 inches and force the inwardly facing ends of the serrations 46 into contact with the surface 27. The sharp edges on the inner ends of the serrations 46 will then tend to prevent relative rotation between the support 22 and the tone wheel 42. Thus, the surface 27 will not be scraped during the assembly of the tone wheel 42 on the support 22 and the sharp edges of the inner ends of the serrations 46 will also tend to prevent axial shifting and misalignment of the tone wheel 42 in the desired plane of rotation.

Figure 5:
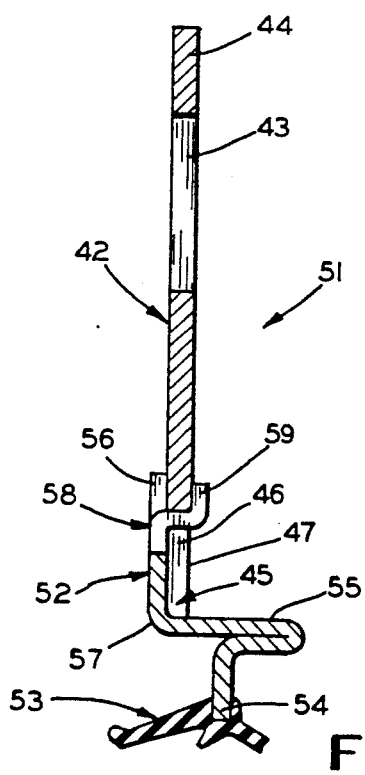
FIG. 5 is a cross-sectional side elevation view of the wheel bearing seal shown in the FIG. 1 with a tone wheel in accordance with an alternate embodiment of the present invention attached.
Figure 6:
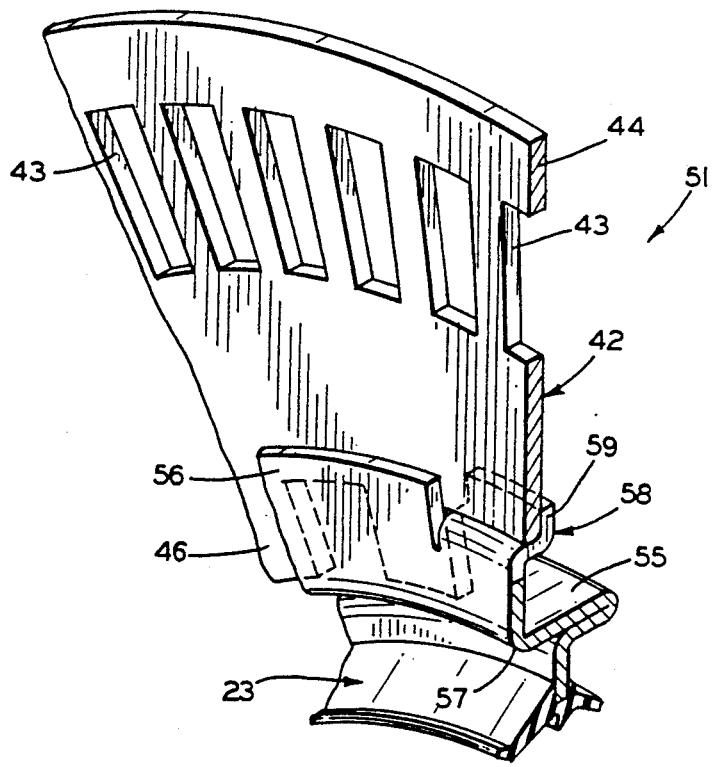
FIG. 6 is a perspective view of the assembly shown in the FIG. 1.

There is shown in the FIGS. 5 and 6, an alternate embodiment of the present invention. A wheel bearing seal and tone wheel assembly 51 includes the tone wheel 52 shown in the FIGS. 3 and 4 and a modified version of the support and seal shown in the FIGS. 3 and 4. A support 52 has a seal 53 molded on an inner periphery 54 defining a central aperture formed in the support ring. The support 52 has a cross-sectional shape similar to the support 22 including a generally axially extending surface 55 similar to the surface 27. Extending radially outwardly from the outer periphery of the support 52 is a flange 56 which is joined to the portion of the support defining the surface 55 by a radius portion 57. As in the first embodiment of the present invention shown in the FIGS. 3 and 4, the inner periphery 45 of the tone wheel 42 is of a dimension which provides a loose fit on the surface 55. A coining operation is performed in the area 47 of the serrations 46 to secure the tone wheel 42 to the support 52. The support 52 also has a tab 58 representing one or more such tabs formed about the outer periphery of the flange 56. The tab 58 extends radially outwardly a short distance and then axially generally parallel to the surface 55 prior to assembly. In some cases, only one of the tabs 58 may be provided and in other cases two or more of the tabs 58 can be provided each aligned with a corresponding one of the spaces between adjacent ones of the serrations 46. After the tone wheel 42 has been installed on the support 52, an outer end 59 of the tab 58 is bent upwardly into contact with an outer surface of the tone wheel 42 to further prevent relative rotation between the tone wheel 42 and the support 52.

As an alternative to the tab 58, there is shown in the FIG. 4, an indentation 61 formed into an outwardly facing surface of the flange 28 by, for example, a staking operation. The forming of the indentation 61 will cause the opposite surface of the flange 28 abutting the serration 46 to be forced into the serration thereby tending to lock the tone wheel 42 to the support 22 and prevent relative rotation there between. The indentation also could be formed in an area between the serrations 46 adjacent one of the radially extending serrations 46 to form a projection in the opposite surface also to prevent relative rotation between the tone wheel 42 and the support 22.

In summary, the present invention includes a speed sensor tone wheel and a method of assembling the tone wheel to a wheel bearing seal. A wheel bearing support has a generally axially extending annular surface formed thereon for the mounting of the tone wheel. A plurality of serrations are formed in the tone wheel about a central aperture. The central aperture has a diameter which provides a loose fit on the support mounting surface to prevent damage to protective coating on the support surface during assembly of the two parts. When the tone wheel is in position on the support surface, a coining operation is performed in an area of the serrations to extend the free ends of the serrations into engagement with the support surface. Tabs can be formed in the periphery of the wheel bearing seal for cooperation with the serrations to prevent relative rotation between the tone wheel and the support. Alternatively, indentations can be formed in the support to form projections which cooperate with the serrations to prevent relative rotation.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A speed sensor tone wheel for assembly with a support of a wheel bearing seal, the support having an axially extending first diameter annular surface connected to a radially extending flange by a radius portion, the tone wheel comprising:
   a generally planar ring-shaped body having an outer periphery and an inner periphery surrounding a second predetermined diameter central opening formed therein;
   a plurality of apertures formed in said body at a predetermined radius adjacent said outer periphery for cooperation with a speed sensor; and
   a plurality of serrations formed in said body about said inner periphery, each of said serrations having an inner end terminated at said second predetermined diameter central opening, said second predetermined diameter being larger than a first predetermined diameter of an axially extending annular surface of a wheel bearing seal support whereby said inner ends of said serrations do not scrape the annular surface when the support is inserted through said central opening and said inner ends engage the annular surface after said serrations are coined.

2. The tone wheel according to claim 1 wherein said body is formed of a metal material having a thickness of approximately 0.054" and after coining said serrations are reduced in thickness approximately 0.006".

3. A speed sensor tone wheel and wheel bearing seal assembly comprising:
   a wheel bearing seal support having a first predetermined diameter axially extending annular surface connected to a radially extending flange by a radius portion;
   a generally planar ring-shaped body having an outer periphery and an inner periphery surrounding a central opening formed therein, said annular surface extending through said central opening;
   a plurality of apertures formed in said body at a predetermined radius adjacent said outer periphery for cooperation with a speed sensor; and
   a plurality of serrations formed in said body about said inner periphery, each of said serrations having an inner end terminated at said central opening and engaging said annular surface, whereby said central opening is formed with a second predetermined diameter being larger than said first predetermined diameter of said annular surface such that said inner ends of said serrations do not scrape said annular surface when said support is inserted into said central opening and said serrations are coined to engage said inner ends with said annular surface and attach said body to said support.

4. The assembly according to claim 3 wherein said body is formed of a metal material having a thickness of approximately 0.054" and after coining said serrations are reduced in thickness approximately 0.006".

5. The assembly according to claim 3 including at least one tab formed in an outer periphery of said flange, said tab extending through an opening between adjacent ones of said serrations and being formed to retain said body between said flange and an outer end of said tab.

6. The assembly according to claim 3 including a plurality of tabs formed in an outer periphery of said flange, each of said tabs extending through an associated opening between adjacent ones of said serrations and being formed to retain said body between said flange and an outer end of said tab.

7. The assembly according to claim 3 including a seal attached to said wheel bearing seal support.

8. The assembly according to claim 3 including at least one indentation formed in said flange and extending into an adjacent one of said serrations.

9. A method of assembling a speed sensor tone wheel to a wheel bearing comprising the steps of:
   a. forming a generally planar ring-shaped body having an outer periphery and an inner periphery surrounding a second predetermined diameter central opening formed therein;
   b. forming a plurality of apertures in said body at a predetermined radius adjacent said outer periphery for cooperation with a speed sensor;
   c. forming a plurality of serrations in said body about said inner periphery, each of said serrations having an inner end terminated at said second predetermined diameter central opening, said second predetermined diameter being larger than a first predetermined diameter of a support surface formed on a wheel bearing seal support whereby said inner ends of said serrations do not scrape the support surface when the support is inserted through said central opening and said inner ends engage the support surface after said serrations are coined; and inserting said support surface formed on said wheel bearing seal support through said central opening.

10. The method according to claim 9 including a step of abutting said serrations against a radially extending flange on the seal support, and coining said serrations to engage said inner ends with the support surface to prevent relative rotation between said body and the seal support.

11. The method according to the claim 10 wherein said body has a thickness of approximately 0.054" and said coining step is performed to a depth of approximately 0.006".

12. The method according to claim 10 including a step of forming at least one tab in said flange prior to said step of inserting and after said step of inserting, bending said tab to maintain said body between said flange and said tab.

13. The assembly according to claim 10 including a step of forming at least one indentation in said flange extending into an adjacent one of said serrations.

14. The assembly according to claim 10 including a step of forming at least one indentation in said flange extending into an opening between adjacent ones of said serrations.

* * * * *